United States Patent [19]
Matsumoto

[11] Patent Number: 5,436,895
[45] Date of Patent: Jul. 25, 1995

[54] SUBSCRIBER TRANSMISSION SYSTEM

[75] Inventor: Hiroyuki Matsumoto, Kawasaki, Japan

[73] Assignee: Fujitsu Limited, Kawasaki, Japan

[21] Appl. No.: 263,808

[22] Filed: Jun. 22, 1994

[30] Foreign Application Priority Data

Jan. 10, 1994 [JP] Japan .................................. 6-013240

[51] Int. Cl.6 ........................ H04L 29/02; H04L 12/12
[52] U.S. Cl. ..................................... 370/60.1; 370/84; 370/110.1
[58] Field of Search ..................... 370/58.1, 58.2, 58.3, 370/60, 60.1, 94.1, 94.2, 110.1, 74, 84

[56] References Cited

U.S. PATENT DOCUMENTS

| | | | |
|---|---|---|---|
| 5,291,493 | 3/1994 | Brock et al. | 370/110.1 |
| 5,305,312 | 4/1994 | Fornek et al. | 370/110.1 |
| 5,331,629 | 7/1994 | Tabata et al. | 370/110.1 |
| 5,347,516 | 9/1994 | Yoshida et al. | 370/110.1 |

FOREIGN PATENT DOCUMENTS 3159496 7/1991 Japan .

*Primary Examiner*—Wellington Chin

[57] ABSTRACT

A subscriber transmission system, which in addition to receiving conventional telephone channels also provides an ISDN service, includes an ISDN switch, a first subscriber transmission equipment connected to the ISDN switch, multiple subscriber terminals, multiple network terminals corresponding to the multiple subscriber terminals, and a second subscriber transmission equipment coupled via a transmission path to the first subscriber transmission equipment. The second subscriber transmission equipment is also connected to the multiple network terminals. Each of the first and second subscriber transmission equipments has a DS0 cross connect function and a function of terminating a physical layer path of the P-ISDN and also allocates a plurality of DS0 signals used by the P-ISDN, to the transmission path.

8 Claims, 7 Drawing Sheets

HDLC FRAME FORMAT

| FLAG SEQUENCE | ADDREES | CONTROL | INFORMATION | FRAME CHK. SEQUENCE | FRAG SEQUENCE |
|---|---|---|---|---|---|
| 01111110 | 8 BITS | 8 BITS | D | 16 BITS | 01111110 |

| 8 | 7 | 6 | 5 | 4 | 3 | 2 | 1 | |
|---|---|---|---|---|---|---|---|---|
| 0 | 0 | 0 | 0 | 0 | 1 | 0 | 0 | Octet 1 |
| 0 | 0 | 0 | 0 | 0 | 0 | 1 | 0 | Octet 2 |
| 1 | 0 | 0 | 0 | 1 | 0 | 0 | 0 | Octet 3 |
| 1 | 0 | 0 | 1 | 0 | 0 | 0 | 0 | Octet 4 |

SUBSCRIBER TRANSMISSION SYSTEM

BACKGROUND OF THE INVENTION

1. Field of the Invention

The present invention relates to a subscriber transmission system for providing a P (Primary rate)-ISDN (Integrated Services Digital Network).

2. Description of the Prior Art

Various types of subscriber services provided by a switch typically located in a central office are generally given to subscribers located near that switch, and the subscribers are generally connected directly to the switch.

However, there are some cases where these subscriber services should be available not only to the subscribers positioned near the switch, but also to those located far from the central office.

In this case, it is extremely uneconomical to place the switch near the subscribers. Further, the trend on the recent services is to provide not only conventional analog telephone services but also extend to ISDN (Integrated Services Digital Network) Services for performing the time division multiplexing of 23B+D signals and the like, including 2B+D signals on the ISDN subscriber line at a remote location and connecting the multiplexed signals to the ISDN switch, by IDLC (INTEGRATED DIGITAL LOOP CARRIER) as disclosed by BELLCORE TR-NWT-000303 and known to those skilled in the art of the present invention.

FIGS. 5 and 6 schematically show conventional analog telephone service system and ISDN telephone service system, respectively.

As shown in FIG. 5, telephone subscribers are connected to a time switch TSW 70 via digital/analog converters 60, respectively. Each digital/analog converter 60 converts an analog signal from the corresponding telephone subscriber TEL into a digital signal and outputs the digital signal as a DS0 signal.

The time switch TSW 70 cross-connects 24 DS0 signals of 64Kb/s according to the assigned time slots, and a multiplexer MUX 80 multiplexes the DS0 signals of 64Kb/s and sends out signals of 1.544Mb/s as a DS1 signal according to frame control signals from a frame generator 90.

In FIG. 6, which shows a conventional ISDN subscriber transmission system, there are 8 subscribers, each of which includes not only telephones but for example, personal computers and therefore, a 144Kb/s digital signal, that is 2B1Q, is output from each subscriber terminal NT.

144Kb/s-speed digital signals from 8 subscribers are interchanged by a corresponding speed interchange circuit 65 into three DS0 signals, each of which has the speed of 64Kb/s. The time switch TSW 70 and multiplier MUX 80 function the same way as those of FIG. 5 and, therefore, one DS1 signal of 1.54Mb/s is sent out from the multiplexer MUX 80.

The ISDN service is mainly used for business so that the ISDN channel is set up in the office and connected to the switch. However, it is considerable that such an office is located at or moved to a suburb.

FIG. 7 is an explanatory view of the cross-connect function of the time switch TSW 70. The time switch TSW 70 cross-connects the DS0 signals according to assigned time slots. A processor 75 is provided to control the time switch TSW 70. The processor 75 detects the off-hook state of any subscriber telephone and sends information of the off-hook state through the TSW switch 70 to an office switch 85. The office switch 85 returns information of a time slot to be assigned to the telephone subscriber to the processor 75 and then processor 75 controls the time switch TSW 70 according to the information of the time slot sent from the office switch 85.

In recent years, a subscriber transmission equipment (DIGITAL LOOP CARRIER in North America) has been proposed and put to practical use. Supposing that the switch is at the central station, the subscriber transmission equipment would correspond to the remote station, and one digital transmission path would be provided between the central station and the remote station. Thus, a multiplexed signal of the high order group of digital hierarchy will be transmitted over such digital transmission path.

The location and the basic structure of a conventional subscriber transmission equipment is shown in FIG. 8. In FIG. 8, reference numeral 1 is an ISDN switch, and numeral 20 denotes a subscriber transmission equipment. A multiplexed digital transmission path 6 is provided between the ISDN switch 1 and the subscriber transmission equipment 20.

The subscriber transmission equipment 20 comprises a multiplexing/demultiplexing circuit 201 connected to the multiplexed digital transmission path 6, and terminals 211~21n connected to multiple subscriber terminals 11~1n (the telephone terminals are shown as an example of FIG. 8).

Terminals 211~21n have an interface function between the multiple subscriber terminals 11~1n and the multiplexing/demultiplexing circuit 201.

The multiplexing/demultiplexing circuit 201 is connected to the central switch 1 via the digital transmission path 6. Circuit 201 has the function of demultiplexing the multiplexed digital signals supplied from the digital transmission path 6, inputting each of those signals to the terminals 211~21n, multiplexing the signals from the terminals 211~21n and sending the multiplexed signals out to the transmission path 6.

In general, the digital transmission path 6 comprises metallic wires, of which one metallic wire has a capability of receiving 24 channels (in the case where it is used in North America) as the subscriber numbers. Thus, it is required to set up a new transmission path, in the case where the subscriber transmission equipment receives the numbers of more than 24 subscribers.

Further, in the conventional telephone service, it was suitable to virtually allocate one telephone channel per one subscriber on the transmission path. It has recently become required, for example, to virtually enable transmission of three telephone channels per one subscriber on the 2B+D service, as the ISDN has expanded the services in recent years.

Furthermore, it is required, for use in TV conferences and the like, to enable the transmission of the maximum of 24 telephone channels per one subscriber. In this way, when the ISDN is extended over a wider range, the subscriber transmission equipment which can receive much more channels should be used.

As described above, the conventional subscriber transmission equipment has only satisfied limited services hitherto. Accordingly, the conventional equipment has been used only for multiplexing and demultiplexing signals for one telephone channel per one subscriber on the transmission path.

Therefore, the service having virtually the multiple telephone channels per one subscriber, such as the ISDN, could not be provided and, it was required to set up a new switch office near the subscriber, in cases where such service was required. However, costs for such a service have been considerable because it was necessary to establish a new switch office, which also led to high management costs after the switch office has been established. Further, the managing of the subscriber network which the telephone company would have to operate due to an additional switch office, also involved high costs.

SUMMARY OF THE INVENTION

Accordingly, it is an object of the present invention to provide a subscriber transmission system which, in addition to receiving conventional telephone channels, can also receive the ISDN service, by using the subscriber transmission equipment.

This and other objects of the invention are attained by a subscriber transmission system which comprises an ISDN switch, a first subscriber transmission equipment coupled to the ISDN switch, a plurality of subscriber terminals, a plurality of network terminals, a second subscriber transmission equipment and a transmission path. Each subscriber transmission equipment has a cross connect function of DS0.

BRIEF DESCRIPTION OF THE DRAWINGS

FIG. 4a shows a HDLC frame format;

FIG. 4b shows sub-portions of information portion of the HDLC frame of FIG. 4a;

FIG. 4c diagrammatically shows an example of information for defining the type of a service provided for a subscriber;

DETAILED DESCRIPTION OF THE PREFERRED EMBODIMENTS

Figure 1:
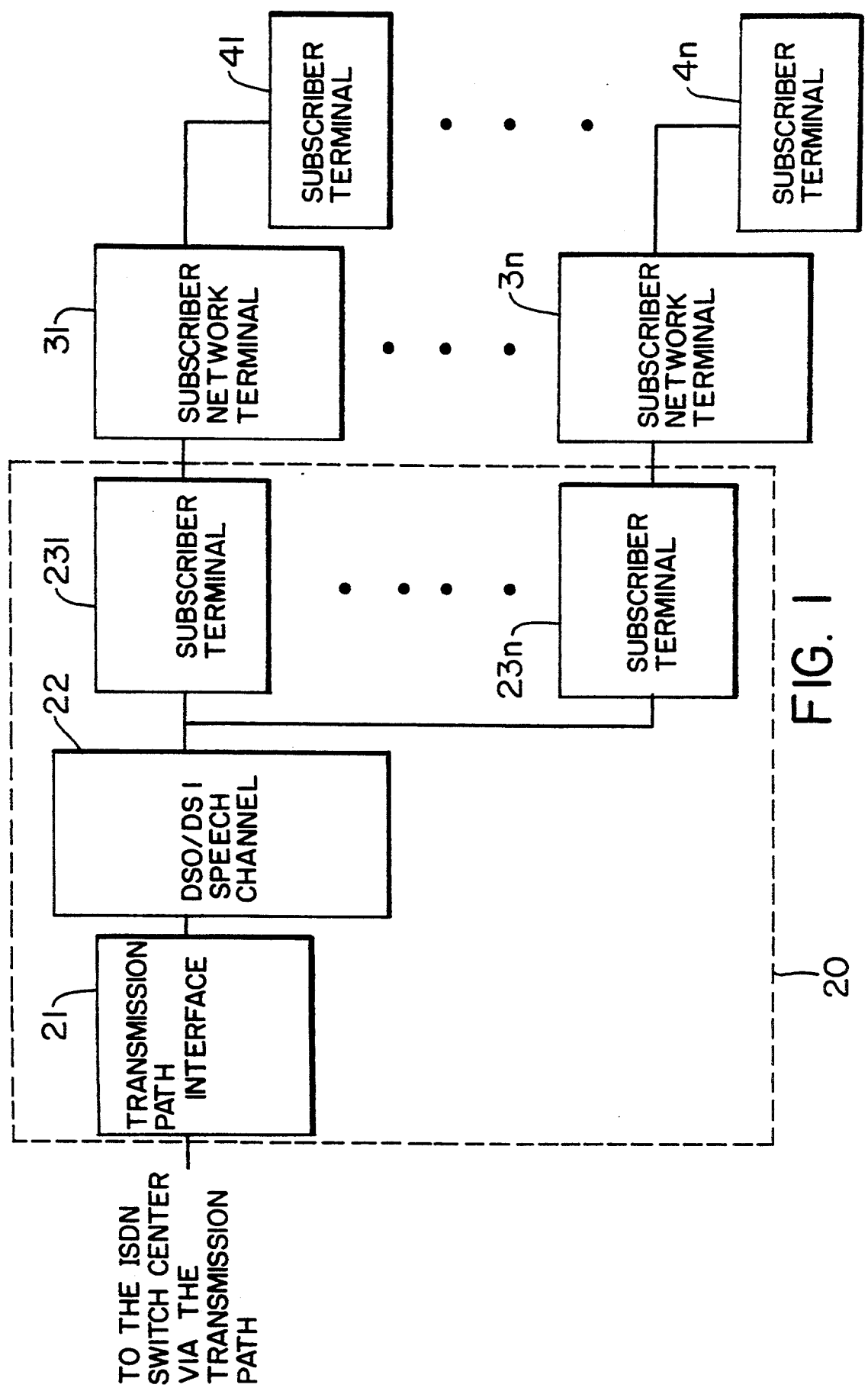
FIG. 1 diagrammatically shows a principle structure of the subscriber transmission system according to the present invention.

In FIG. 1, reference numeral 20 is a subscriber transmission equipment connected to an ISDN switch via the transmission path 6. The subscriber transmission equipment 20 is further connected to each of a plurality of subscriber terminal equipments 41~4n through subscriber network terminals 31~3n corresponding thereto.

The subscriber transmission equipment 20 which has a DS0 cross connect function and a function of terminating a physical layer path of the P(Primary Rate)-ISDN, is constituted so as to allocate the multiple DS0 signals which are used by one P (Primary Rate)-ISDN to the transmission path 6.

The term "physical layer" used throughout the specification means the first layer of OSI (Open System Interconnection), which is the network architecture of the International Standard, and it defines electrical and physical controls between devices.

DS0 has one time slot for one subscriber having a speed of 64 Kb/s. The subscriber transmission equipment 20 also has a DS1 cross connect function and allocates to the transmission path 6 per one P-ISDN. Here, DS1 has a speed of 1,544 MBPS which is multiplexed time slots required for 24 subscribers.

The subscriber transmission equipment 20 with its functions as above can be provided at the ISDN switch.

The subscriber transmission equipment 20 at the side thereof, connected to transmission path 6, has a transmission path interface board 21, a DS0/DS1 speech channel or communication path board 22, and subscriber terminals 231~23n having an interface function with the plurality of corresponding subscriber network terminals 31~3n.

The present invention has a DS0/DS1 speech channel board 22 in the subscriber transmission equipment 20, whereby the signal of the ISDN is secured by performing the replacement of the signal according to the service type provided.

Figure 2:
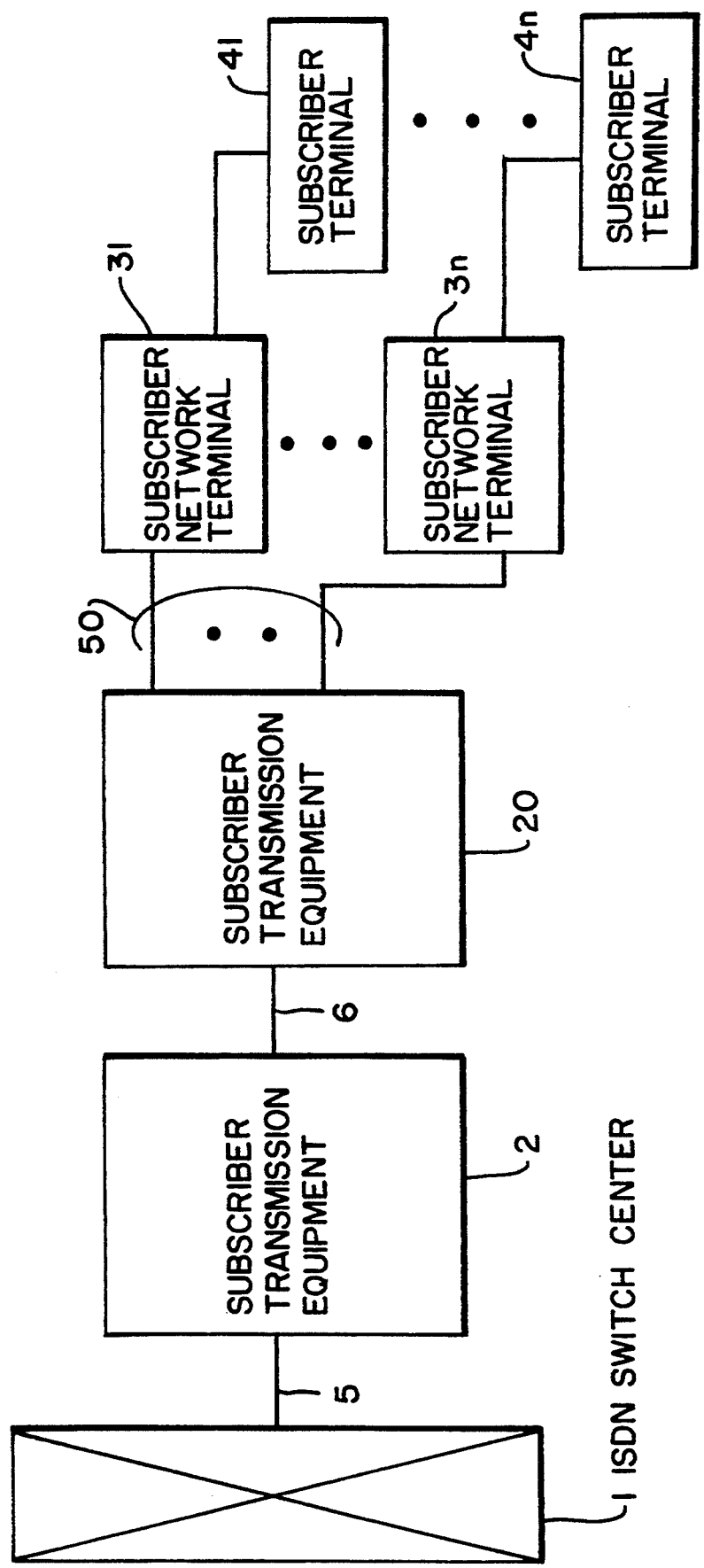
FIG. 2 diagrammatically shows a subscriber transmission system of the present invention.

FIG. 2 diagrammatically shows the subscriber transmission system of the embodiment of the present invention. In FIG. 2, reference numeral 1 is an ISDN switch which is connected to a first subscriber transmission equipment 2 via a subscriber line 5.

The first subscriber transmission equipment 2 multiplexes signals inputted from the subscriber line 5 and sends them to the multiplexed digital transmission path 6. Conversely, the multiplexed digital signals from the transmission path 6 are demultiplexed in the first subscriber transmission equipment 2 and sent to the subscriber line 5.

Reference numeral 20 is a second subscriber transmission equipment which is provided on the subscriber terminal side. Numerals 41~4n designate a plurality of subscriber terminals which are connected to the second subscriber transmission equipment 20 via the corresponding subscriber network terminals (NT1) 31~3n. The first and second subscriber transmission equipments 2 and 20 have same structure.

Figure 3:
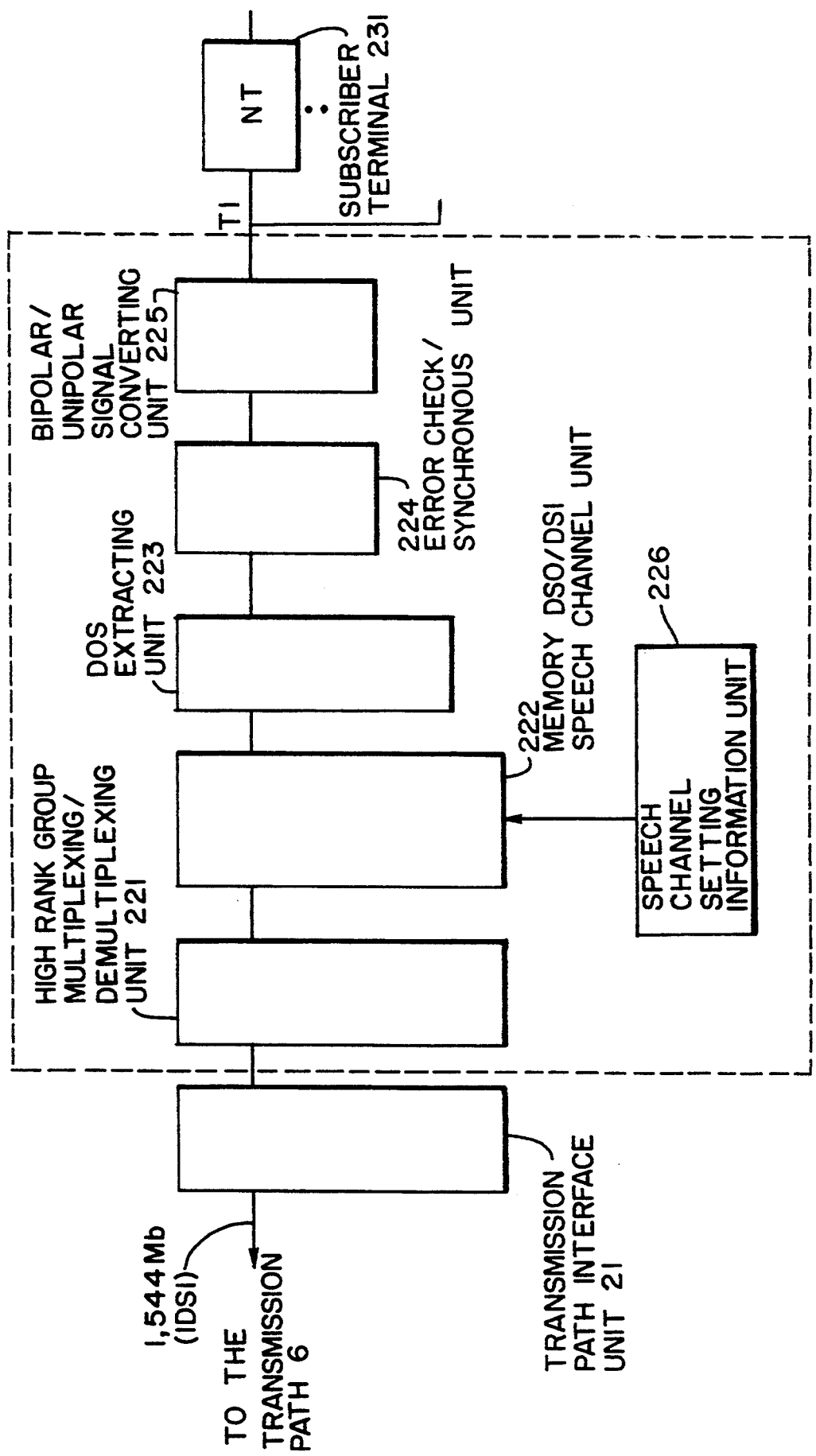
FIG. 3 is a block diagram of the subscriber transmission equipment of the system of FIG. 1.

FIG. 3 is a block diagram showing the subscriber transmission equipment of the transmission system of FIG. 1 and corresponding to the second subscriber transmission equipment 20 of FIG. 2.

In FIG. 3, reference numeral 21 is a transmission path interface unit or circuit. 22 is a DS0/DS1 speech channel board. Circuit 21 has the interface function between the transmission path 6 and the DS0/DS1 speech channel board. Numeral 231 designates one of the multiple subscriber terminals each corresponding to a respective one of the multiple subscriber network terminals (NT1) 31~3n, as shown in FIG. 1.

The subscriber terminal 231 serves as an interface with the respective subscriber network terminal. In the case of the P(Primary Rate)-ISDN, interface is DS1 so that the DS1 signal is terminated here.

The DS0/DS1 speech channel board 22 includes a high order group speed multiplexing/demultiplexing unit (MUX) 221, a memory (DS0/DS1) speech channel unit 222 (corresponding to switch TSW), a DS0 signal extracting unit 223 which is a speed interchange circuit similar to that used in the conventional system, an error check/synchronizing circuit or unit 224, and a bipolar-/unipolar signal converting unit 225. Further, the board 22 has a speech channel set information unit 226 which is a processor.

When used in North America, T1 signal is bipolar so that the subscriber transmission equipment 20 further performs converting of bipolar/unipolar signals and extracting a transmission clock signal in the bipolar-/unipolar signal converting unit 225. The bipolar signal T1 is converted into a unipolar signal by unit 225.

The error check/synchronizing unit 224 provides the function of synchronizing the signals required for transmission. Further, the unit 223 extracts DS0 signal, as required when servicing the subscriber by error check functions to guarantee the transmission characteristic, and passes signals to the memory (DS0/DS1) speech channel unit 222. The signals output from the DS0 extracting unit 223 are 64KbX24 or 24DS0 signals.

The memory (DS0/DS1) speech channel unit 222 comprises a volatile memory. The DS0 signal from the subscriber terminal side is stored in the appropriate memory address of the volatile memory, according to the speech channel setting information received from the speech channel setting information unit (processor) 226 (as shown by the arrow in FIG. 3).

A speech channel setting information is the information for indicating what time slot is allocated to the speech signal via a data link. The speech channel setting information is given in the form of the address of the volatile memory of the memory (DS0/DS1) speech channel unit 222.

The DS0 signal stored in the memory address of the memory (DS0/DS1) speech channel unit 222 by the speech channel setting information is converted to a DS1 signal bundled in 24 channels by the high order group speed multiplexing/demultiplexing unit (MUX) 221 and sent to the transmission path 6 through the transmission path interface unit 21.

The requirement for generating the speech channel setting information will be described as follows:

The information about an "off hook" signal is inputted from the subscriber terminal side to the speech channel setting information unit 226, through the bipolar/unipolar signal converting unit 225 and the error check/synchronizing unit 224. After that, the allocation request for the time slot is sent to the ISDN switch 1, via the high order group speed multiplexing/demultiplexing unit 221 from the speech channel setting information unit 226.

The ISDN switch 1 detects the idle time slot and sends a reply signal containing the information indicating the idle time slot to the speech channel information setting unit 226. The speech channel information setting unit 226 specifies the memory address location in the memory.

This procedure is defined by the ANSI protocol, which is the same as the conventional TMC (Time Management Control). However, in the conventional system, when the ISDN is provided, DS0 is always occupied, irrespective of whether the ISDN subscriber is busy or idle. Thus, DS0 is always connected to the switch 1. When an ISDN is provided, it becomes 2B+D, so that it requires three time slots. However, in the conventional system, the protocol does not provide three time slots.

That is, for the allocation of the time slot, the ISDN switch 1 gives one time slot number to be allowed in the conventional system, according to the protocol shown in BELLCORE TR-NWT-000303.

The information for indicating an ISDN service is sent to the ISDN switch 1 in addition to the information on PBX (Private Branch Exchange), POTS (telephone terminals) and the like, according to the present invention. That is, when the new information type is allocated it is recognized in the ISDN switch 1 and the information requiring three time slots (for 2B+D) is sent to the speech channel information setting unit or processor 226.

Accordingly, as the time slots are determined the call control between the subscriber terminal and the ISDN switch 1 is then performed according to the conventional system.

Processor 226 is provided, which sends information that a subscriber is off-hooked and the subscriber is an ISDN subscriber, to an ISDN switch. The ISDN switch then ISDN subscriber, to an ISDN switch. The ISDN switch then returns to the processor an information of three time slots, which are assigned to the off-hooked ISDN subscriber.

Once time slots are assigned by the ISDN switch, the processor 226 can control the unit 222 (corresponding to the time switch TSW of the conventional system).

Thus, each subscriber transmission equipment has a cross connect function of DS0 and a function for terminating a physical layer path of P(Primary Rate)-ISDN (Integrated Services Digital Network) so that a plurality of DS0 signals which are used in one P-ISDN are allocated to the transmission path.

The term "physical layer path of P-ISDN" means a path through which P-ISDN signals flow, and "terminating a physical layer path of the P-ISDN" means to terminate P-ISDN signals flowing through the path.

In FIG. 2, the path corresponds to the subscriber line 5, 50 or transmission path 6.

Figures 4A, 4B, 4C:
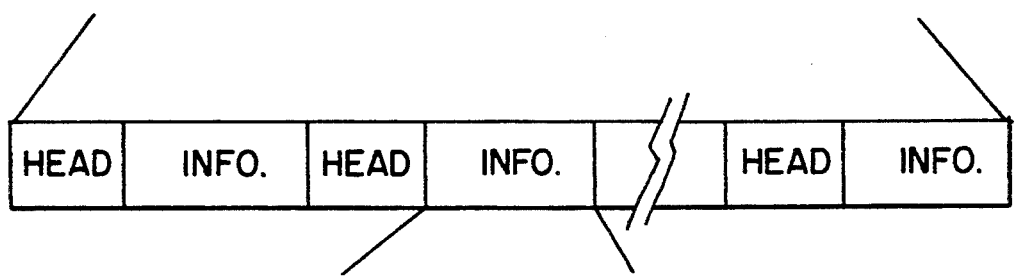
Figure 5:
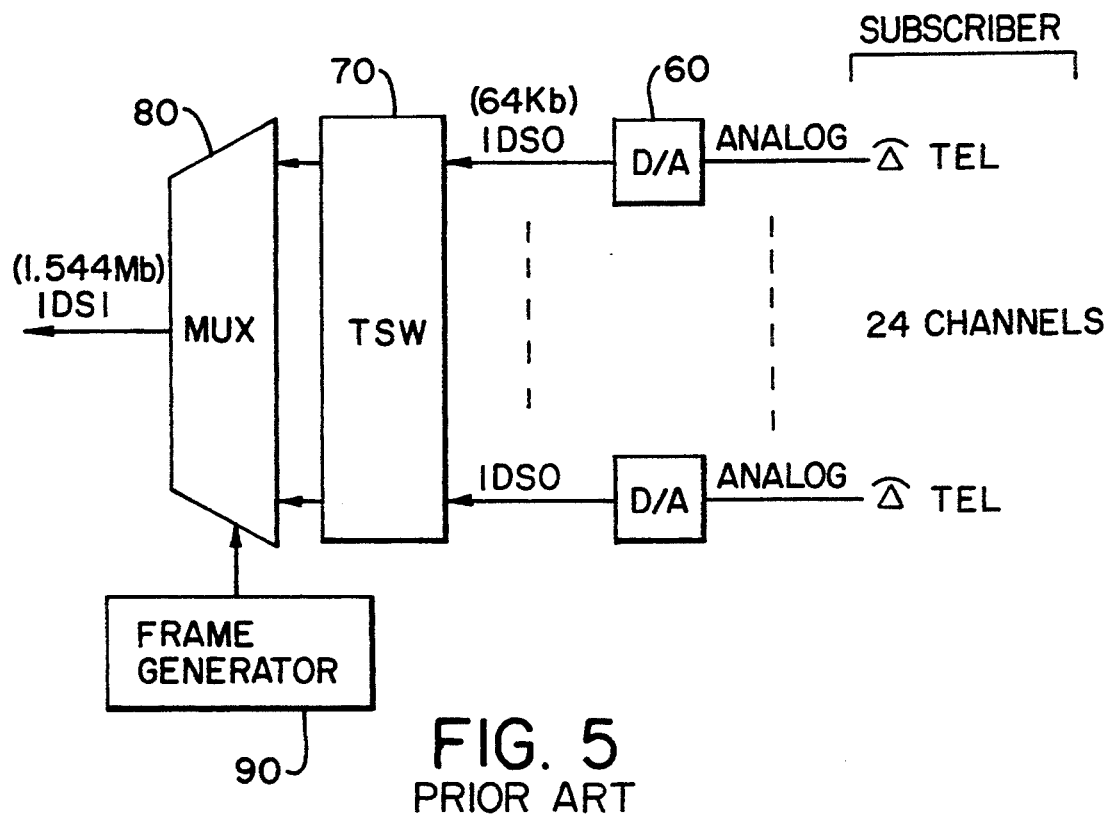
FIG. 5 is a schematic view of a conventional analog telephone service system.
Figure 6:
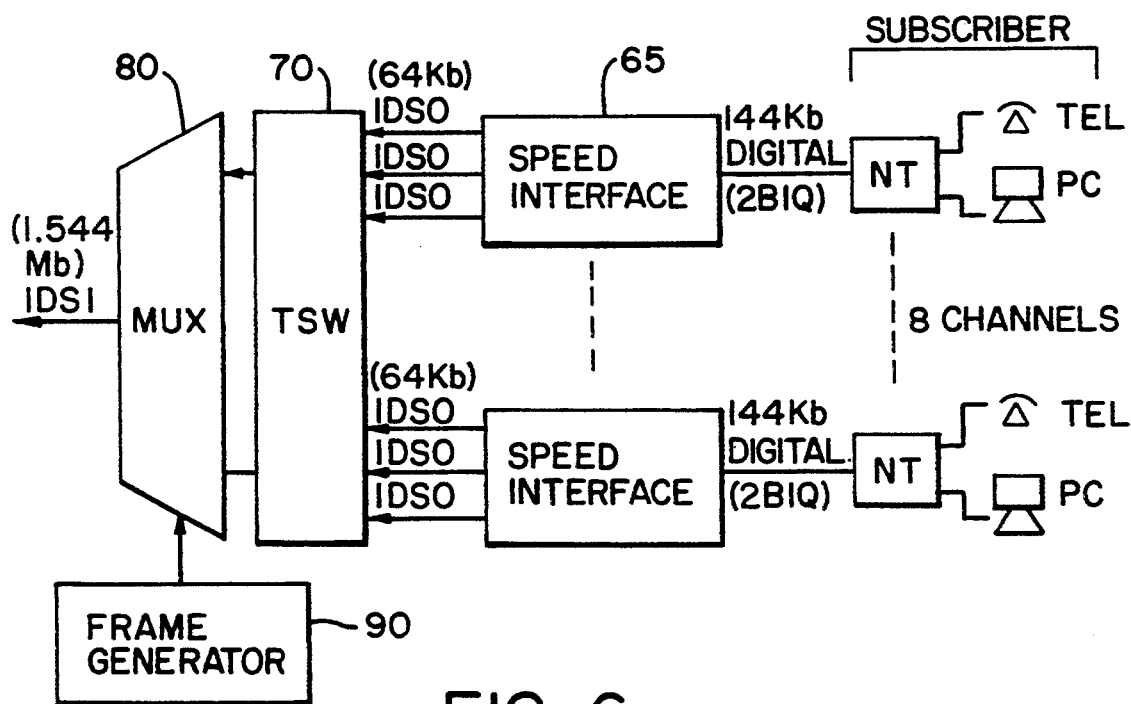
FIG. 6 is a schematic view of a conventional ISDN service system.
Figure 7:
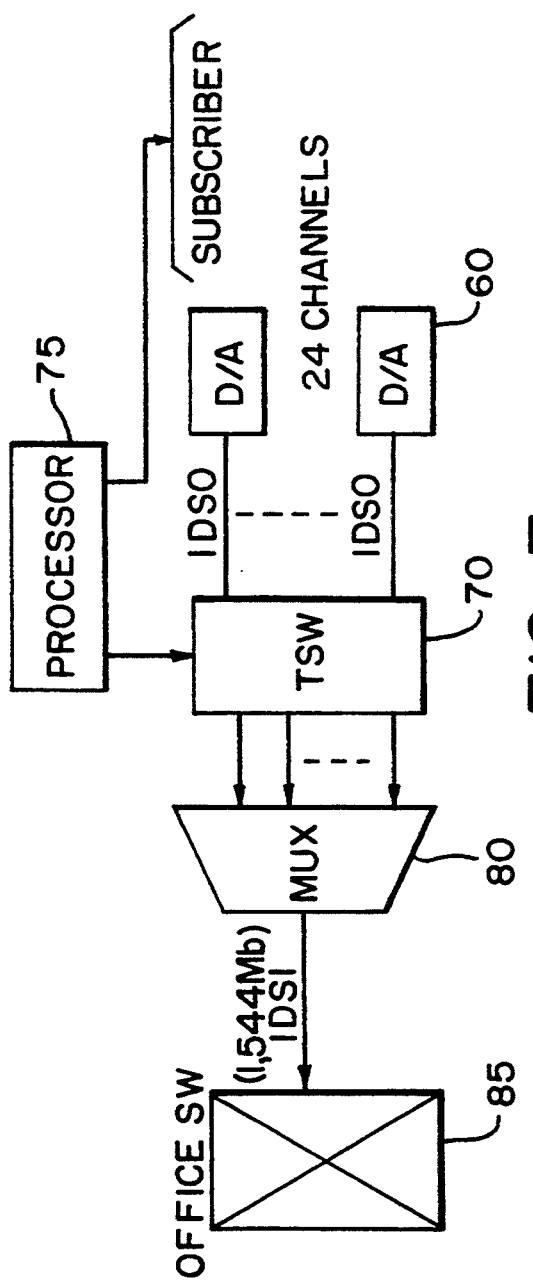
FIG. 7 is an explanatory view of the cross-connect function of a time switch provided in the conventional subscriber transmission system.
Figure 8:
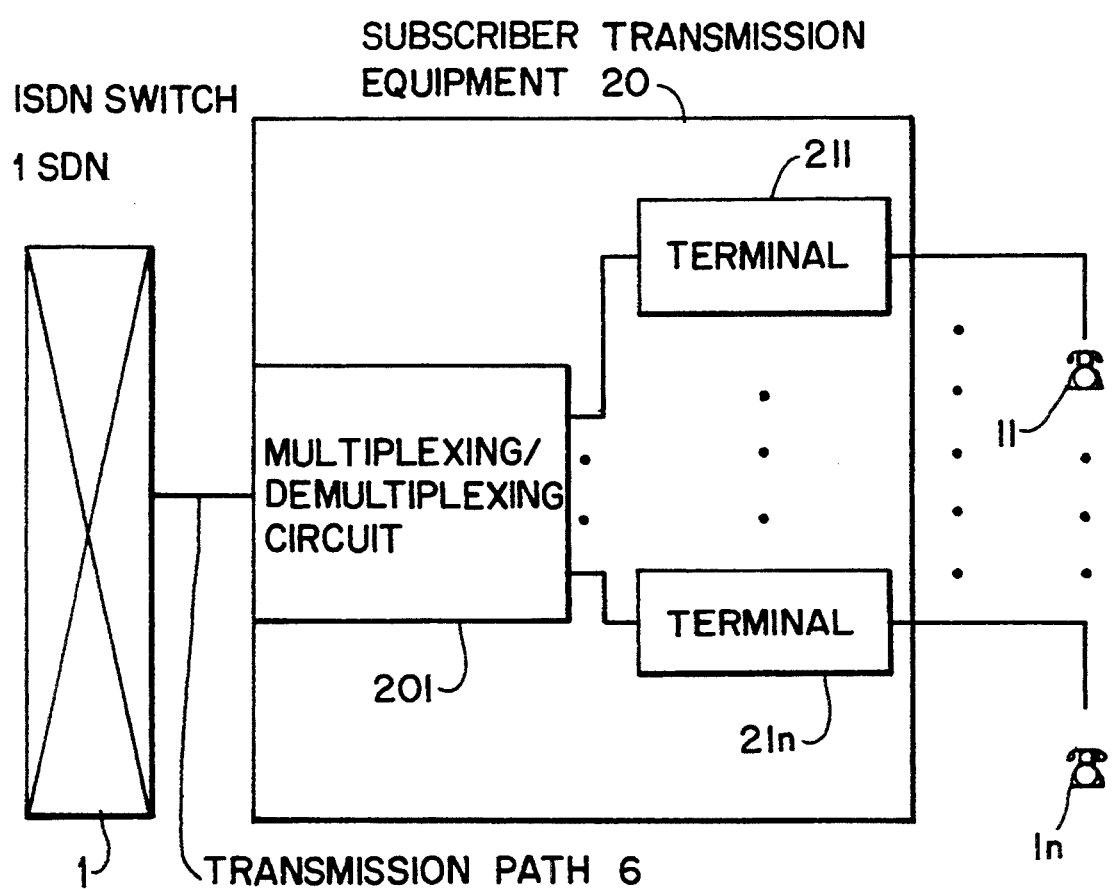
FIG. 8 is a block diagram of the conventional subscriber transmission equipment.

Signals are transmitted between the ISDN switch and the unit 226 (processor) in the form of a HDLC frame-format. The HDLC frame-format is defined as shown in FIG. 4A. The HDLC frame-format includes front and rear flag sequences that are respectively positioned at the front and rear portions of the HDLC frame-format and comprise digits of 01111110, an address portion of 8 bits that indicates the address of a subsidiary office, a control portion of 8 bits that indicates a control information, an information portion that has optional number of digits including zeros and a frame check sequence of 16 bits.

The information from the processor to the ISDN switch and the information from the ISDN switch back to the processor are allocated in the information portion of the HDLC frame-format.

The information portion includes a plurality of sub-portions as shown in FIG. 4B. Each of the sub-portions comprises a head and an information, and one of the sub-portions is used for a call control protocol that is defined in the Bellcore specification TR-NWT-000303. Information D is an optional number of digits including zeros.

The sub-portion used for the call control protocol can be recognized by the head of the sub-portion. The already existing service types for the call control protocol fixed by Bellcore TR-NWT-000303 are indicated by OCTETs 1-4 of eight bits in FIG. 4C. The channel form (the service type) is provided as a code information. The specified code patterns are determined by CCITT Recommendation Q931.

In the present invention, the information indicating that a subscriber is off-hooked and is an ISDN subscriber, and indicating which three time slots are assigned to the subscriber, can be provided by using other OCTETs than the OCTETs 1–4.

Thus, in the transmission system of the present invention, not only the information indicating an "off hook" state is sent to the speech channel information setting unit 226 but also the information is added indicating an ISDN terminal. Thus, three time slots required for the ISDN signal are allocated from the ISDN switch 1.

For example, information on the numbers of three idle time slots such as 1, 2 and 3 or 3, 5 and 6, is transmitted from the ISDN switch 1 to the speech channel information unit 226.

The present invention makes it possible to define code patterns other than established patterns for the ISDN.

In the system of the present invention, it is also possible to provide services for presenting multiple telephone channels per one subscriber in the subscriber transmission equipment. It is also possible to present the service of the P-ISDN at the locations other than the service area near the ISDN switch.

Further, as it is not required to set any new switch, costs required for management of the system are not increased. Furthermore, the load for managing the subscriber network would not be increased either.

Having described preferred embodiments of the invention, it will now become apparent to one of skill in the art that other embodiments incorporating their concepts may be used. It is felt, therefore, that these embodiments should not be limited to disclosed embodiments but rather should be limited only by the spirit and scope of the appended claims.

What is claimed is:

1. A subscriber transmission system comprising:
    an ISDN switch;
    a first subscriber transmission equipment coupled to said ISDN switch;
    a plurality of subscriber terminals;
    a plurality of network terminals each coupled to a corresponding one of said plurality of subscriber terminals;
    a second subscriber transmission equipment coupled to said plurality of network terminals; and
    a transmission path provided between said first subscriber transmission equipment and said second subscriber transmission equipment, wherein
    each of said first and second subscriber transmission equipments has a DS0 cross connect function and a function for terminating a physical layer path of P(Primary Rate)-ISDN (Integrated Services Digital Network) so that a plurality of DS0 signals which are used in one P-ISDN are allocated to said transmission path.

2. A system according to claim 1,
    wherein each of said first and second subscriber transmission equipments further has a DS1 cross connect function to allocate said transmission path per one P-ISDN.

3. A system according to claim 2, wherein said second subscriber equipment includes a bipolar/unipolar signal converting unit coupled to said network terminals and converting bipolar signals received therefrom into unipolar signals, an error check/synchronizing unit coupled to said bipolar/unipolar signal converting unit for receiving signals therefrom and synchronizing said signals, a DS0 extracting unit coupled to said error check/synchronizing unit for extracting DS0 signals from signals received from said synchronizing unit, a memory unit for storing said DS0 signals received from said DS0 extracting unit, and a speech channel setting information unit coupled to said memory unit for indicating what time slot is allocated to a speech signal via a data link so that a DS0 signal from a respective subscriber terminal is stored in a respective memory address in said memory unit.

4. A system according to claim 3, wherein said second subscriber equipment further includes a multiplexing/demultiplexing unit coupled to said memory unit for converting said DS0 signal stored therein to a DS1 signal which is sent to said transmission path.

5. A system according to claim 4, and further comprising a transmission interface unit provided at an output of said second subscriber equipment and coupled to said multiplexing/demultiplexing unit.

6. A system according to claim 3, wherein said speech channel setting information unit is a processor which sends to said ISDN switch, information that a respective subscriber is in an "off-hook" state and that said subscriber is an ISDN subscriber so that said ISDN switch detects at least one idle time slot and returns to said processor information indicating the idle time slot which is assigned to the subscriber which is in the "off-hook" state.

7. A system according to claim 1,
    wherein said first subscriber transmission equipment is provided at said ISDN switch, and
    each of said ISDN switch and said second subscriber transmission equipment has means to provide a DS0 cross connect function and a function for terminating the physical layer path of the P-ISDN to allocate the plurality of DS0 signals which are used in one P-ISDN, to said transmission path.

8. A system according to claim 1,
    wherein said first subscriber transmission equipment is provided at said ISDN switch, and
    each of said ISDN switch and said second subscriber transmission equipment further has means to provide a DS1 cross connect function to allocate to said transmission path per one P-ISDN.

* * * * *